(12) United States Patent
Clegg et al.

(10) Patent No.: US 8,341,858 B2
(45) Date of Patent: Jan. 1, 2013

(54) VIDEO DEVICE AND METHOD

(75) Inventors: Timothy P. Clegg, Los Angeles, CA (US); Michael D. Ronk, Los Angeles, CA (US)

(73) Assignee: Americhip, Inc., Los Angeles, CA (US)

( * ) Notice: Subject to any disclaimer, the term of this patent is extended or adjusted under 35 U.S.C. 154(b) by 0 days.

(21) Appl. No.: 13/225,084

(22) Filed: Sep. 2, 2011

(65) Prior Publication Data

US 2011/0311196 A1 Dec. 22, 2011

Related U.S. Application Data

(63) Continuation of application No. 12/413,343, filed on Mar. 27, 2009, now Pat. No. 8,011,122, which is a continuation-in-part of application No. 12/263,277, filed on Oct. 31, 2008, now abandoned, which is a continuation-in-part of application No. 12/199,740, filed on Aug. 27, 2008, now abandoned.

(51) Int. Cl.
G09F 1/00 (2006.01)
(52) U.S. Cl. .................... 40/124.03; 434/317
(58) Field of Classification Search ............. 40/124.03, 40/455, 463, 717; 434/317
See application file for complete search history.

(56) References Cited

U.S. PATENT DOCUMENTS

| | | |
|---|---|---|
| 190,588 A | 5/1877 | Holding |
| 1,141,172 A | 6/1915 | Clark |
| 2,107,450 A | 2/1938 | Miller |
| 2,298,601 A | 5/1940 | Tremblett |
| 2,367,967 A | 11/1942 | Schwartz |
| 2,543,670 A | 2/1951 | Regensburg |
| 4,209,824 A | 6/1980 | Kaufman |
| 4,231,034 A | 10/1980 | Bechteler |
| 4,286,399 A | 9/1981 | Funahashi et al. |
| 4,433,783 A | 2/1984 | Dickinson |
| 4,607,747 A | 8/1986 | Steiner |
| 4,611,262 A | 9/1986 | Galloway et al. |
| 4,614,266 A | 9/1986 | Moorhead |
| 4,656,469 A | 4/1987 | Oliver |
| 4,703,573 A | 11/1987 | Montgomery et al. |
| 4,791,741 A | 12/1988 | Kondo |
| 4,847,124 A | 7/1989 | Lux nee Andrieux |
| 4,855,725 A | 8/1989 | Fernandez |
| 4,866,865 A | 9/1989 | Yang |
| 5,063,698 A | 11/1991 | Johnson et al. |
| 5,230,501 A | 7/1993 | Melton |
| 5,245,171 A | 9/1993 | Fox et al. |
| 5,275,285 A | 1/1994 | Clegg |
| 5,359,793 A * | 11/1994 | Copperstone ............. 40/124.09 |
| 5,416,310 A | 5/1995 | Little |
| 5,452,269 A | 9/1995 | Cherdak |
| 5,463,725 A | 10/1995 | Henckel |

(Continued)

OTHER PUBLICATIONS

Non-Final Office Action issued in corresponding U.S. Appl. No. 12/199,740, Notification Date: Jun. 24, 2010.

(Continued)

*Primary Examiner* — Gary Hoge
(74) *Attorney, Agent, or Firm* — Jeffer Mangels Butler & Mitchell LLP

(57) ABSTRACT

An article of print media that includes an electronic module that has at least one chip for storing data and for controlling the electronic module and first means for closing the electronic module such that at least a first video is shown.

16 Claims, 7 Drawing Sheets

U.S. PATENT DOCUMENTS

| | | | |
|---|---|---|---|
| 5,577,918 A | 11/1996 | Crowell | |
| 5,652,606 A * | 7/1997 | Sasaki et al. | 345/204 |
| 5,761,836 A | 6/1998 | Dawson | |
| 5,778,574 A | 7/1998 | Reuben | |
| 5,815,954 A | 10/1998 | Huang | |
| 5,845,218 A | 12/1998 | Altschul | |
| 5,860,065 A | 1/1999 | Hsu | |
| 5,901,484 A | 5/1999 | Seder | |
| 5,912,653 A | 6/1999 | Fitch | |
| 6,030,089 A | 2/2000 | Parker | |
| 6,104,306 A | 8/2000 | Hogue et al. | |
| 6,126,201 A | 10/2000 | Pace et al. | |
| 6,226,959 B1 | 5/2001 | Krasuski et al. | |
| 6,279,170 B1 | 8/2001 | Chu | |
| 6,286,873 B1 | 9/2001 | Seder | |
| 6,369,793 B1 | 4/2002 | Parker | |
| 6,445,347 B1 | 9/2002 | Yoshimi | |
| 6,525,706 B1 * | 2/2003 | Rehkemper et al. | 345/87 |
| 6,573,880 B1 | 6/2003 | Simoni | |
| 6,591,523 B2 | 7/2003 | Pines | |
| 6,693,515 B2 | 2/2004 | Clapper | |
| 6,754,344 B2 | 6/2004 | Kohli et al. | |
| 6,788,283 B1 | 9/2004 | Blotky | |
| 6,895,261 B1 | 5/2005 | Palamides | |
| 6,905,019 B2 | 6/2005 | Lacomis | |
| 6,985,135 B2 | 1/2006 | Sugimoto | |
| 7,058,163 B1 | 6/2006 | Parekh et al. | |
| 7,127,841 B1 | 10/2006 | Weber | |
| 7,151,541 B2 | 12/2006 | Seder | |
| 7,181,300 B2 | 2/2007 | Robbins | |
| 7,240,442 B2 | 7/2007 | Clegg | |
| 7,242,315 B2 * | 7/2007 | Affolter et al. | 340/815.83 |
| 7,278,570 B2 | 10/2007 | McGee et al. | |
| 7,278,584 B1 | 10/2007 | Gandel et al. | |
| 7,331,132 B1 | 2/2008 | Seder | |
| 7,336,788 B1 | 2/2008 | Hendricks | |
| 7,356,050 B2 | 4/2008 | Reindl et al. | |
| 7,376,564 B2 | 5/2008 | Selg | |
| 7,396,049 B2 | 7/2008 | Nelson | |
| 7,429,965 B2 | 9/2008 | Weiner | |
| 7,436,318 B2 | 10/2008 | Affolter | |
| 7,634,864 B2 | 12/2009 | Segan | |
| 7,802,386 B2 * | 9/2010 | Mandelbaum et al. | 40/124.03 |
| 2001/0040560 A1 * | 11/2001 | Amron | 345/169 |
| 2001/0043194 A1 | 11/2001 | Amron | |
| 2003/0182827 A1 | 10/2003 | Youngdahl | |
| 2004/0066915 A1 | 4/2004 | Turner et al. | |
| 2004/0150983 A1 | 8/2004 | Sexton | |
| 2004/0248073 A1 * | 12/2004 | Pinkerman et al. | 434/308 |
| 2005/0011776 A1 | 1/2005 | Nagel | |
| 2005/0108773 A1 | 5/2005 | Jung et al. | |
| 2005/0119023 A1 | 6/2005 | Sudo et al. | |
| 2005/0194434 A1 | 9/2005 | Trent, Jr. | |
| 2005/0270280 A1 | 12/2005 | Riback | |
| 2005/0271354 A1 * | 12/2005 | Yeh | 386/46 |
| 2006/0134591 A1 * | 6/2006 | Karat | 434/308 |
| 2007/0069883 A1 | 3/2007 | Collier, Jr. | |
| 2007/0171278 A1 | 7/2007 | Chen | |
| 2007/0215694 A1 | 9/2007 | Clegg | |
| 2008/0010871 A1 | 1/2008 | Holmes | |
| 2008/0289230 A1 * | 11/2008 | Mandelbaum et al. | 40/124.01 |
| 2009/0027566 A1 | 1/2009 | Wargon | |
| 2009/0211126 A1 * | 8/2009 | Oh | 40/124.03 |
| 2009/0238544 A1 * | 9/2009 | Orsini | 386/124 |
| 2010/0005377 A1 | 1/2010 | Batan | |
| 2010/0250255 A1 | 9/2010 | Stern | |

OTHER PUBLICATIONS

Response to Non-Final Office Action filed in corresponding U.S. Appl. No. 12/199,740, filed Aug. 24, 2010.
Final Office Action issued in corresponding U.S. Appl. No. 12/199,740, Notification Date: Nov. 15, 2010.
Non-Final Office Action issued in corresponding U.S. Appl. No. 12/263,277, Notification Date: Dec. 10, 2010.
International Search Report dated Sep. 1, 2009 for related PCT No. PCT/US2009/049579.

* cited by examiner

VIDEO DEVICE AND METHOD

This application claims priority from, incorporates by reference and is a continuation of U.S. patent application Ser. No. 12/413,343, filed Mar. 27, 2009, which is a continuation in part of U.S. patent application Ser. No. 12/263,277, filed Oct. 31, 2008, which is a continuation in part of U.S. patent application Ser. No. 12/199,740, filed Aug. 27, 2008, now abandoned, which are each incorporated by reference as though set forth fully herein.

FIELD OF THE INVENTION

The present invention relates generally to video novelty devices, and, more particularly, to recordable video novelty devices and methods for operating same.

BACKGROUND OF THE INVENTION

Video displays are known in the art including video displays that are incorporated into apparel and statues. As used herein, "video" means video alone or in combination with audio. As used herein "message" means a message that is either visual, audio or both.

In addition, there are audible greeting cards that play prerecorded messages activated either by a slide tongue mechanism that begins to play the recorded message when the card is opened or by a button that is pressed to initiate the playback. Other cards are able to record short audio messages that are later played back when the card by either opening the card and triggering the tongue mechanism or pressing a button located somewhere on the card. There are yet other cards that play prerecorded music or make other sounds. None of these cards, however, are able to perform two or more sensory actions at once, where one of the actions is created by the user or do some other combination of sensory displays simultaneously that involve some personalized message or display created by the user.

SUMMARY OF THE PREFERRED EMBODIMENTS

The present invention is a novelty method and device suitable for insertion into print media such as greeting cards, magazines, packaging, direct mail, point of purchase ("POP") displays, gift cards; into apparel such as t-shirts, caps, and hats; other devices such as plastic novelty items, sculpted novelty items, figurines, statues, models, watches, jewelry, or any other type of object in which a personalized message would be desired.

An embodiment of the present invention comprises an electronic module containing at least one microchip for storing data and for controlling the electronic module and means for triggering the electronic module in a first manner such as, but not limited to, the use of a switch, pressure button, solar cell, magnets, light, sensors, motions sensors, vibration trigger, tilt trigger, or the like, which causes at least a first sensory action such as, but not limited to, sound, music, music and sound, lights, flashing lights, vibration, shaking, release of a scent, the spraying of confetti, a visual display, a video, or any other type of visual, auditory, physical or olfactory effect, to occur. Thereafter, when the module is triggered in a second manner, such as, but not limited to, by the use of second means for closing, which may be, but is not limited to, a second switch, a pressure button, solar cell, magnets, light sensors, motions sensors, vibration trigger, tilt trigger, or the like, a personalized second sensory action or message may be created by the user at the same time as the first sensory action occurs, and/or a new video may be recorded to replace the original video.

In one embodiment of the present invention, in which there is a personalized secondary sensory action, it may be an auditory message which will be recorded by the user onto the microchip, a visually displayed message displayed on LCD, a synchronized and illuminated OLED, fiber optics, LED or other type of programmable visual display connected to the microchip, a recorded or prerecorded video which is stored by the user onto the microchip, music or vocals that are selected from a variety of music and/or vocals recorded and stored on the microchip by the user or some other type of personalized visual or auditory message.

In a preferred embodiment of the present invention, the user can continually recreate or record the personalized secondary sensory action until a satisfactory personalized message is obtained.

In a preferred embodiment in which a video is to be the first or second sensory action, means for downloading the sensory action is provided, which may be a USB or some other type of downloading port or connector known in the art.

In many of the embodiments of the invention, once the satisfactory message is obtained, the ability to record a new message is disabled, so that no further recording can occur. This can be achieved by a mechanical, electrical or wireless signal disruption, or by any other means to prevent a recording from taking place.

In some embodiments of the present invention, the novelty item contains a third means for closing which may be, but is not limited to a switch, pressure button, solar cell, magnets, light sensors, motion sensors, vibration trigger, tilt trigger, or the like, which when activated causes the speed of the playback of the personalized recorded message to change via the software contained on the chip. In another embodiment of the present invention, there may be another means for closing, which may be, but is not limited to, a different switch, pressure button, solar cell, magnets, light sensors, motion sensors, vibration trigger, tilt trigger, or the like, which when activated, causes the microchip to process the personalized message so that the message is altered. By way of example and not limitation, in one embodiment of the invention where a vocalized message has been recorded, by pressing this switch or button or the like, the message is processed by the microchip such that the voice of a particular movie star, cartoon character, robot or some other person or entity is heard speaking/singing the message, or in another embodiment, the message is processed such that a special effect is imposed upon the voice originally recorded such that, by way of example, and not limitation, the message sounds like the person is underwater or is electronically talking or has some other speech altering effect imposed upon the original recording.

In a method of the present invention, an electronic module containing a memory chip and software, is charged by, such as, but not limited to, the closing of a switch, the pressing of a button, exposing a solar cell or a light sensor to light, joining of opposing magnets, moving a motion sensor, vibration trigger, tilt trigger, or the like, such that at least a first sensory action occurs. The sensory action could be, but is not limited to sound, music, music and vocals, lights, flashing lights, vibration, shaking, release of a scent, confetti or the like, the playing of a video or other visual effect or another physical, visual, audible or olfactory action of some type.

After the module is charged again, the software stored on the memory chip causes the first or another sensory action to occur while a personalized message, such as a vocals, music, sound, the programming of an LED, OLED or LCD display or another type of programmable visual display or a video to be created by the user.

By way of example and not limitation, in a particular embodiment, a video could be created by using CCD chipsets, an on-board movie camera, another type of video recorder, a flash card or the like, connecting the module to another device using a cable or wireless communication device.

After the message is created and recorded, when the module is charged again, the microchip detects the recorded message and causes the message to be played at the same time as the sensory action that was occurring while the message was being created. In yet a further embodiment of the present invention, more than one sensory effect can occur while the message is playing by adding the appropriate chipsets, software, sensory devices, and triggers.

In yet another method of the present invention, the user can continually recreate messages or download videos until a satisfactory message or video is created. In yet another method of the present invention, once a satisfactory message or video is created, the ability to create another version of the message or download a different video is disabled.

In yet a further method of the present invention, a user can speed up or slow down the playback of the message and/or the sensory action. In yet another method of the present invention, the software processes the vocal message after it is recorded so that it no longer sounds like it did when it was created, such that it can sound like a particular movie star, cartoon character, other person, robot, person talking underwater or it causes the message to be processed by any other type of vocally altering or distorting effect.

In yet another preferred embodiment of the present invention, a thin video display is incorporated into print media such as a greeting card, magazine, advertisement, POP, packaging or the like. Means are provided to record, download or replace the video to be shown on the video display. In some embodiments means are also provided to recharge the power source for the video display.

In yet another preferred embodiment of the present invention, there is provided a novelty item that includes an electronic module having at least one chip for storing data and for controlling the electronic module; and first means for closing the electronic module such that at least a first video is shown. In a preferred embodiment, the novelty item includes a second means for closing the electronic module such that at least a second video is shown. Preferably, the electronic module and chip are housed in a foldable support structure, the first means for closing the electronic module is a slide tongue that moves when the foldable support structure is opened or closed, and the second means for closing the electronic module is a button.

In yet another preferred embodiment there is provided a method of playing a video. The method includes providing a foldable support structure having a video screen, a memory having at least a first video stored therein and an energy source, wherein the foldable support structure has a closed position and an open position and the foldable support structure is initially in the closed position. The method also includes moving the foldable support structure to the open position, thereby causing a first switch to be closed and the first video to be played on the video screen.

In another preferred embodiment, there is provided an article of print media comprising an electronic module that includes at least one chip for storing data and for controlling the electronic module, a video screen, and a first switch activator for closing a first switch in the electronic module such that at least a first video is shown on the video screen.

BRIEF DESCRIPTION OF THE DRAWINGS

The present invention may be more readily understood by referring to the accompanying drawings, in which like numerals refer to like parts, and in which.

DETAILED DESCRIPTION OF THE PREFERRED EMBODIMENTS

In the following descriptions of the invention, terms such as "front," "back," "top," "bottom," "side," and the like are used herein merely for ease of description and refer to the orientation of the components as shown in the Figures.

Figure 1:
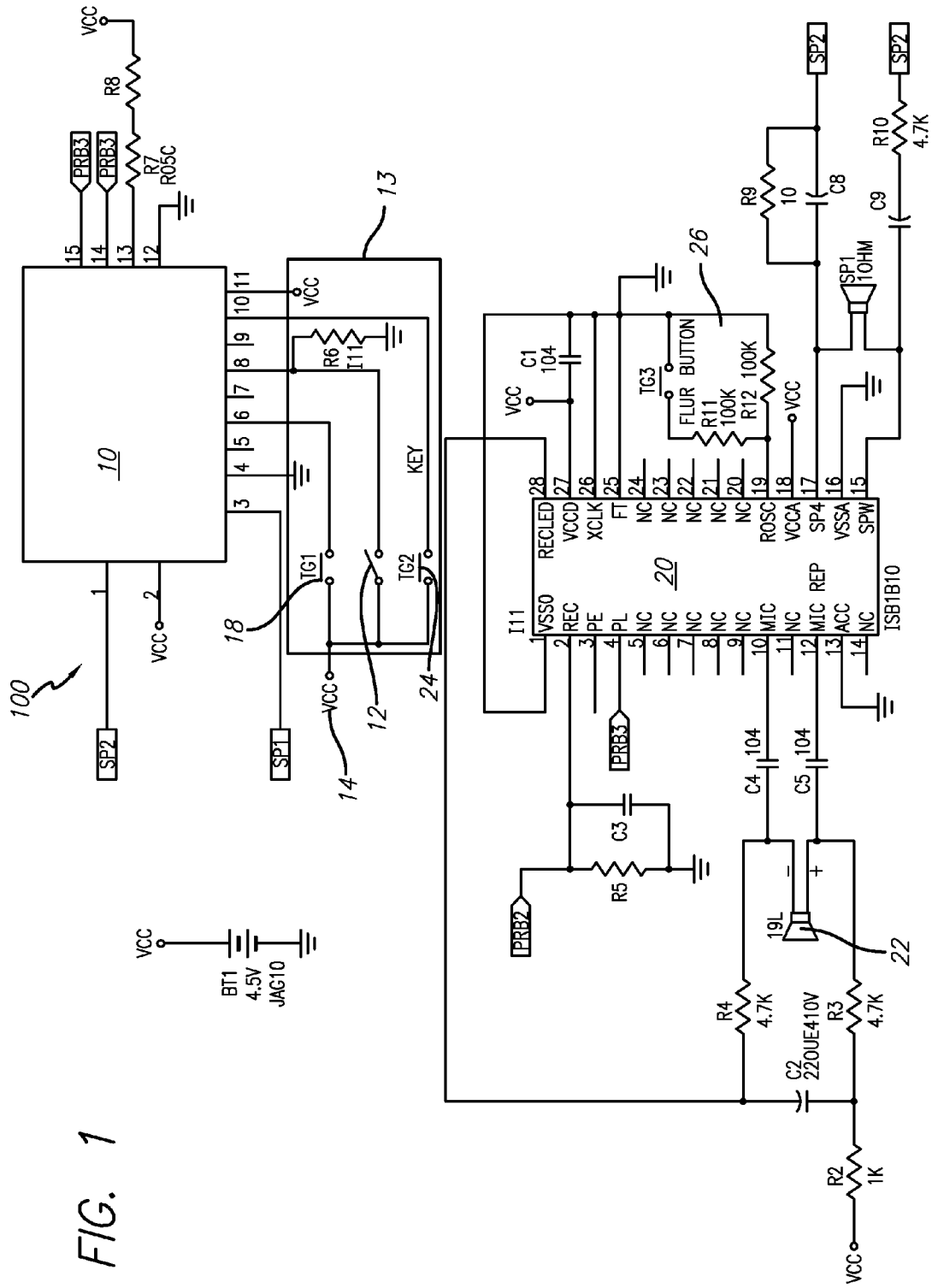
FIG. 1 is a schematic of one embodiment of the present invention.

Generally, the present invention may be briefly described as follows. Referring first to FIG. 1, a schematic of the electronic module 100 of the present invention is shown.

The electronic module 100 can be mounted into, onto or affixed to print media such as greeting cards, magazines, packaging, direct mail, point of purchase ("POP") displays, gift cards; into apparel such as t-shirts, caps, and hats; other devices such as plastic novelty items, sculpted novelty items, figurines, statues, models, watches, jewelry, or any other type of object in which a personalized message would be desired.

In a preferred embodiment, the electronic module 100 comprises a first and a second electronic microchips 10 and 20. In alternate embodiments only one microchip may be used that performs the same functions as the first and second microchip 10 and 20. Likewise, additional microchips can be added to the module 100 to increase the functionality, add additional sensory effects or cause additional sensory effects to occur.

In a preferred embodiment, microchip 10 contains all of the prerecorded data and the software that controls the various features of the module. In the same preferred embodiment, microchip 20 controls the recording and playback features of the module. However, one microchip that performs both functions may be used.

In a preferred embodiment, microchip 10 is coupled to a switching means 13. In the preferred embodiment, switching means 13 is comprised of two switches 12 and 18, but in an alternate embodiment a third switch 24 is used. As used herein, switch shall be interchangeably used with pressure button, solar cell, magnets, light sensors, motions sensors, vibration trigger, tilt trigger, or the like; however, any structure known in the art that can cause a module to close and let power flow through can be used.

The switching means 13 is connected to a power source 14, which in a preferred embodiment is comprised of button batteries of sufficient size to power the module and software.

However, any miniature mountable power source of sufficient power may be used such as, but not limited to, solar cells, direct drives, mechanically driver drives and the like. The preferred button batteries used to power the device are of sufficient capacity as to allow the device to be operated repeatedly for several months.

In a preferred embodiment, the batteries are laid flat and mounted on the same module board containing the first and second microchips 10 and 20.

In a preferred embodiment of the present invention, the power source is rechargeable. Thus, a port (not shown) such as a USB port, an AC or DC connector port, or another type of port known in the art is connected to the power source which recharges the power source using a computer or another power source.

In a preferred embodiment, the output of the first microchip 10 is connected to the input of the second microchip 20.

In a preferred embodiment of the present invention the second microchip 20 is connected to a microphone 22 for recording a verbal message or vocals. In the same preferred embodiment, the output of the second microchip 20 is connected to a flat speaker 16. However, in alternate embodiments, numerous speakers (not shown) may be connected to provide stereo or surround sound or any means that generates sound other than speakers can be used with suitable electronic modifications made to the microchip for driving the speakers.

In alternate embodiments of the present invention such as the one shown in FIG. 3, the second microchip 20 either may be connected directly to a video recorder (not shown) for recording a video message which then is recorded onto the microchip 10 or is connected through a USB or other type port (not shown) to a computer or other video device to download a video onto the microchip. In a preferred embodiment, the port may be the same port referred to above for recharging the power source. In a preferred embodiment, see FIG. 3, the visual display 113 may be, but is not limited to, an LCD, OLED or LED device, that is attached to the output of one of the microchips. The input can be a prerecorded plug in player, a small still 52 or movie camera (not shown), a LCD array or the like. In another embodiment, the input can be from a flash drive, a wireless communication device, a hard wired device, a USE or other type port connected to a computer or to a video camera and the like.

Likewise in other alternate embodiments of the present invention, either of the microchips may be connected to OLEDs, LEDS (not shown) or to miniature light bulbs or other light generating devices known in the art, in order to create a visual effect such as a steady, flashing or synchronized light. In other alternate embodiments, the microchips may be connected to a mechanism such as an offset motor 54 or any other similar device known in the art that will cause the device to vibrate, shake or cause some other physical action. In yet further embodiments of the present invention, the microchips may be connected to a small housing 15 containing a capsule (not shown) containing confetti, some other item, or a scent, and, at the appropriate time determined by the microchip, the capsule will break in response to a signal from the first microchip 10 to release the contents.

In an embodiment this can be achieved by using a capsule under pressure that is electronically or mechanically ruptured, such as, but not limited to, triggering a spring loaded arm with a striker that breaks the capsule.

In other embodiments, the capsule may be a spray tube so that in response to a signal from the first microchip 10, a spring loaded or the like nozzle will cause the contents of the spray tube to be released.

In another preferred embodiment of the present invention, another switching means 26 is attached to the second microchip 20. In some embodiments, the switching means 26 will be a pressure button, which when pressed, will trigger the software to cause the speed at which the message is played to change so that the message will be played back either faster or slower. In other embodiments, the switching means 26 can causes the original message to become altered by triggering the appropriate software to process the original message. By way of example and not limitation, switching means 26 could trigger software contained within the first or second microchip to process the original verbal message so that the voice becomes that of a cartoon character, well-known personality, or becomes distorted in some way such as sounding electronic, sounding like it was recorded underwater, or some other distorted way.

In operation, the module of the present invention operates as follows. When switch 12 is first closed, the microchip 10 is powered such that it causes a preprogrammed first sensory action to occur. By way of example and not limitation, that first sensory action could be the playback of prerecorded music, the playback of prerecorded music and vocals, the playback of a video, the playback of sounds, the flashing or steady shining of a light, the vibration or shaking of the object on which the electronic module has been attached, the spraying of a spray tube containing a scent, or any type of aural, visual, olfactory or physical action and the like.

In a preferred embodiment of the present invention, when switch 18 is closed, microchip 10 is powered such that it causes both the first sensory action to occur and causes microchip 20 to begin to record a personalized message. As set forth above, the personalized message may be vocal or visual. By way of example and not limitation, when the first sensory action is the playback of music, the personal message might be vocals sung by the user or another verbal message, the possibilities are limitless.

Alternatively, the personal message might be a video that may be recorded by the second microchip 20. In alternative methods of the present invention, when switch 18 is closed microchip 10 powers a programmable visual display 113 on which the user inputs a message that is recorded to be displayed on the visual display device 113 attached to microchip 20.

After the personalized message or alternate video is recorded, when switch 12 is closed again, the personalized message or video will be played back at the same time that the first sensory action occurs if desired.

In a preferred method of the present invention, the step of creating a personalized message or video can be repeated over and over again by repeatedly closing switch 18 until a satisfactory personalized message or video is created. In yet another embodiment, an additional switch, switch 24 can be connected to the module, to erase the previous recordings, so as to allow the personalized message or video to be rerecorded.

In yet a further preferred method of the present invention, after a satisfactory personalized message or video is created, switch 18 is permanently disabled. In a preferred embodiment, the disabling means 11 may be a tape, a string, a button or the like physically attached to switch 24, such that pulling on the disabling means 11 will disable or break switch 24 so that the module is unable create any further recordings. The disabling means could also be a button or switch attached to the module that when pressured will permanently disable any future recordings.

In the present invention, once microchip 10 determines whether a message or new video has been recorded, it will select the next action to take place when the module is again closed by switch 12.

In a preferred method of the present invention, when switch 261 is closed, microchip 20 causes the speed of the playback of the personalized message to change so that it is faster or slower than originally recorded. In yet another method of the present invention, microchip 10 processes the recorded message causing the original message to become altered. For example, when the original message is a vocal recording, the microchip can make the original recording sound like it emanated under water, or was spoken by a cartoon character or by some other famous person or distort or alter the recording in any other similar manner using special effects well known in the art.

Likewise, in another method of the present invention, another sensory action, such as those previously mentioned, which are also stored on the first microchip 10, could be triggered upon the particular occurrence of the closing of the module so that it occurs at the same time as the playback of the message.

In one embodiment of the present invention, the first sensory action is prerecorded music and vocals stored on microchip 10. By way of example and not limitation, in that embodiment, when switch 12 is closed, the prerecorded music and vocals play. Thereafter, when switch 18 is closed, just the prerecorded music is heard through speaker 16 so that the vocals of the user can be recorded by microchip 20 via microphone 22. In the same embodiment, the next time that switch 12 is closed, the prerecorded music and the user recorded vocals will be played back so that they are heard at the same time. In another embodiment, instead of vocals being recorded, the user can record a personalized visual message (such as a video, or a message to be displayed on the visual display) with appropriate alterations to the module 100. For example, the module 100 can have a USB connector (not shown) attached thereto or contain a wireless communication device (not shown), a flash drive, or any other video device for downloading a video onto the module. In other embodiments, the module may contain a video camera, a CCD array or the like for recording a video.

Figure 2:
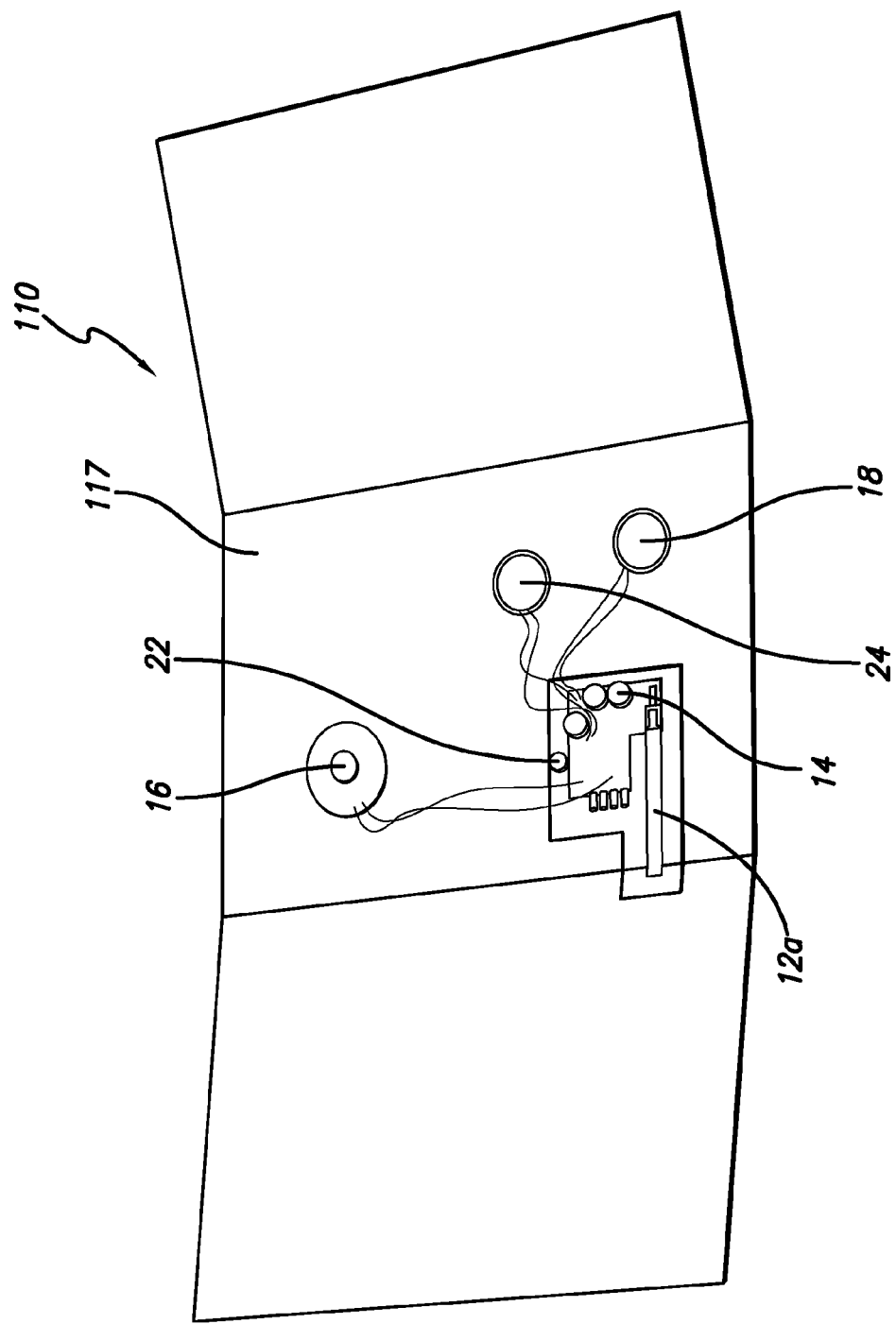
FIG. 2 is a plan view of a preferred embodiment of the present invention as it is used in a greeting card.

Referring next to FIG. 2, a preferred embodiment of the present invention is shown mounted onto a support structure 117 in a greeting card 110. In FIG. 2, greeting card 110 has a slide tongue mechanism 12a that operates switch 12. Slide tongue mechanism 12a is connected to microchip 10, such that sliding of the tongue mechanism 12a generally along one dimension causes either activation or deactivation of the microchip 10. The switch 12 is activated by the tongue mechanism 12a such that the folding or unfolding of the greeting card causes the tongue mechanism 12a to either deactivate or activate the switch 12 and thereby activate or deactivate the microchip 10, respectively. In another embodiment, instead of using a slide tongue mechanism, the switch 12 can be operated by a push mechanism or button (not shown), a light sensor, pressure button, switch, magnets, motions sensor, vibration trigger, tilt trigger, or the like, or any other module closing device known in the art with appropriate modifications to the module. The push mechanism can be a small dome or membrane having conductive material with an electric insulator such that the unfolding of the device can cause the module to close.

In the greeting card embodiment of the present invention, a speaker 16 and a microphone 22 is shown. Batteries 14 are connected to the provide the power necessary to run the system. There also is another switch activator which is shown as a push mechanism 24, although any switching mechanism can be used. In the embodiment shown, the switch activator 24 is a small dome or membrane having conductive material with an electric insulator which is receptive to touch so that pushing on the push mechanism will cause the recording of the personalized message to occur. Likewise, in a greeting card embodiment, switch activators 18 and/or 26 can also be a push mechanism, however, any switch activator known in the art can be used. The slide tongue 12 is also referred to herein as a switch activator.

In a preferred embodiment the greeting card is a karaoke card on which prerecorded music has been stored in microchip 10. When switch activator 24 is triggered by the user, it closes the module and energizes microchips 10 and 20 so that vocals can be recorded at the same time as the music is playing. Thereafter when switch 12 is activated, the recorded vocals will be played back at the same time as the music.

In one embodiment, the greeting card also contains prerecorded music and vocals on microchip 10 that are played tack every time that there are no recorded vocals. The vocals can be the lyrics to the song sung by a professional singer or could be instructions on how to operate the card.

In one embodiment, continuous pushing on switch activator 26 will alter the speed of the playback of the recorded vocals and music. Alternatively in other embodiments, pushing on switch activator 26 will alter the recorded vocals such that they do not sound the same as when they were originally recorded.

By repeatedly pressing on push button 24, the vocals may be recorded over and over until satisfactory recorded vocals are created by the user. Thereafter, disabling means 11 such as a tape, string, button or the like, may be attached to switch 24 such that pulling on it will disable or break switch 24 so that the module is unable create any further recordings.

In addition, the greeting card could contain at least one gap through which a small bulb or LED could emit light for creating a visual effect when switch 24 is triggered. Likewise, the card could have an additional mechanism (not shown) attached for creating a physical action when switch 24 is triggered.

In yet further embodiments, the greeting card could contain a means for selecting prerecorded music by way of example, and not limitation, by having a plurality of music choices stored on the microchip and having a switch which is turned to input the exact music selected by the user.

Figures 3A, 3B:
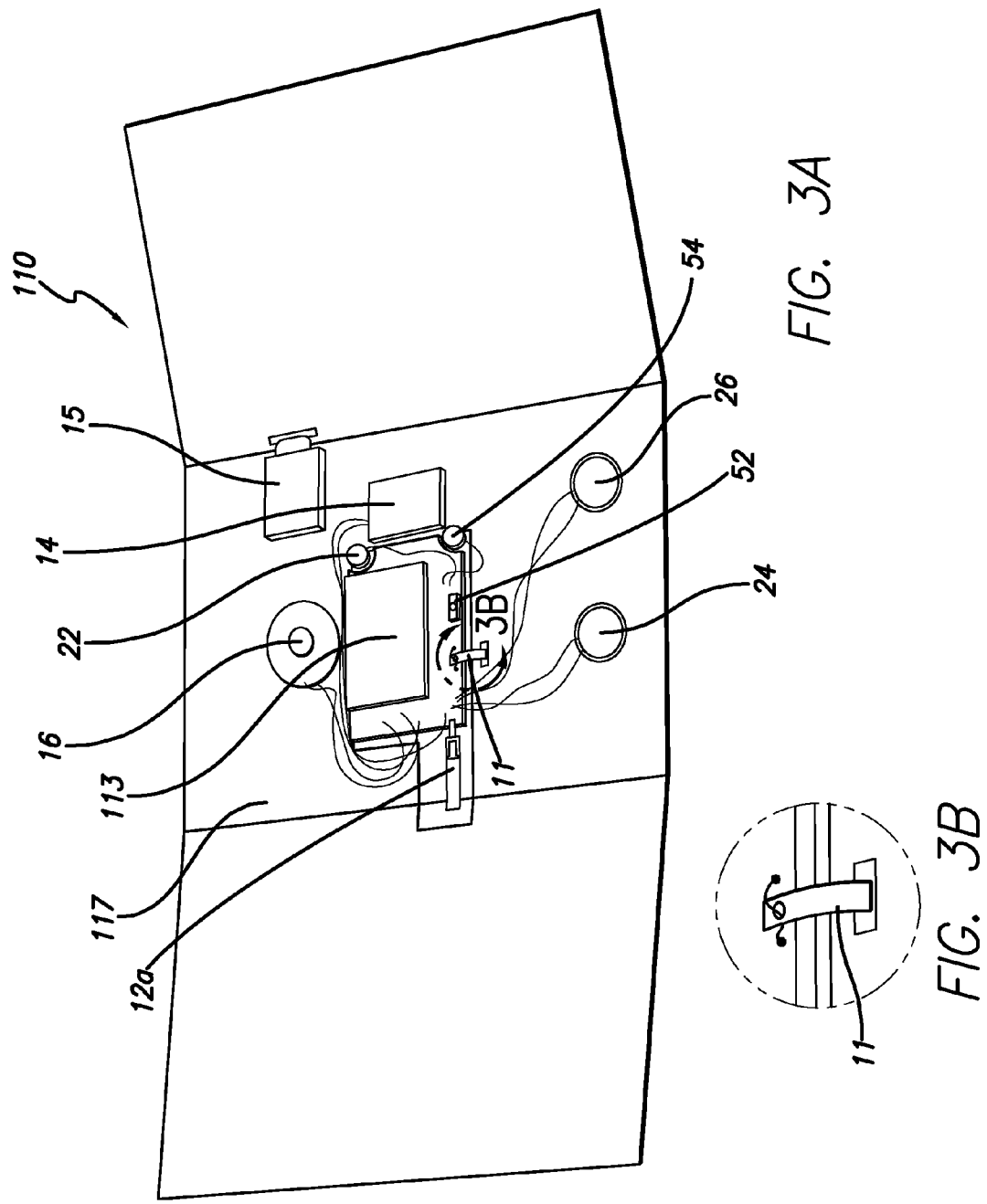
FIG. 3 is a plan view of an alternate preferred embodiment of the present invention as it is used in a greeting card.

Referring once again to FIG. 3A, an alternate preferred embodiment of the present invention is shown mounted onto a support structure 117 in a greeting card 110. In FIG. 3A, greeting card 110 has a slide tongue mechanism 12a. Slide tongue mechanism 12a is slidably connected to switch 12 which is connected to microchip 10 in FIG. 1, such that sliding of the tongue mechanism generally along one dimension causes either activation or deactivation of the microchip 10. The switch 12 is activated by the tongue mechanism 12a such that the folding or unfolding of the greeting card causes the tongue mechanism to either deactivate or activate the switch 12 and thereby activate or deactivate the microchip 10, respectively. In another embodiment, instead of using a slide tongue mechanism, the switch 12 can be operated by a push mechanism or button (not shown), a light sensor, pressure button, switch, magnets, motions sensor, vibration trigger, tilt trigger, or the like, or any other module closing device known in the art with appropriate modifications to the module. The push mechanism can be a small dome or membrane having conductive material with an electric insulator such that the unfolding of the device can cause the module to close.

In the greeting card embodiment of the present invention, a speaker 16 and a microphone 22 is shown. Batteries 14 are shown connected to the provide the power necessary to run the system. There also is another switch activator 24 which is shown as a push mechanism, although any switching mechanism can be used.

In the embodiment shown, the switch activator 24 is a small dome or membrane having conductive material with an electric insulator which is receptive to touch so that pushing on the push mechanism will cause the recording of the personalized message to occur. Likewise, in a greeting card embodiment, switch activator 26 is also a push mechanism, however, any switch activator known in the art can be used. Pushing on switch activator 26 can cause the recording to do something unusual like speed up, slow down, come out in a different voice, etc. For example, where a vocalized message has been recorded or prerecorded, by pressing switch activator/button 26 or the like, the message is processed by the microchip such that the voice of a particular movie star, cartoon character, robot or some other person or entity is heard speaking/singing the message, or in another embodiment, the message is processed such that a special effect is imposed upon the voice originally recorded such that, by way of example, and not limitation, the message sounds like the person is underwater or is electronically talking or has some other speech altering effect imposed upon the original recording.

Figure 4:
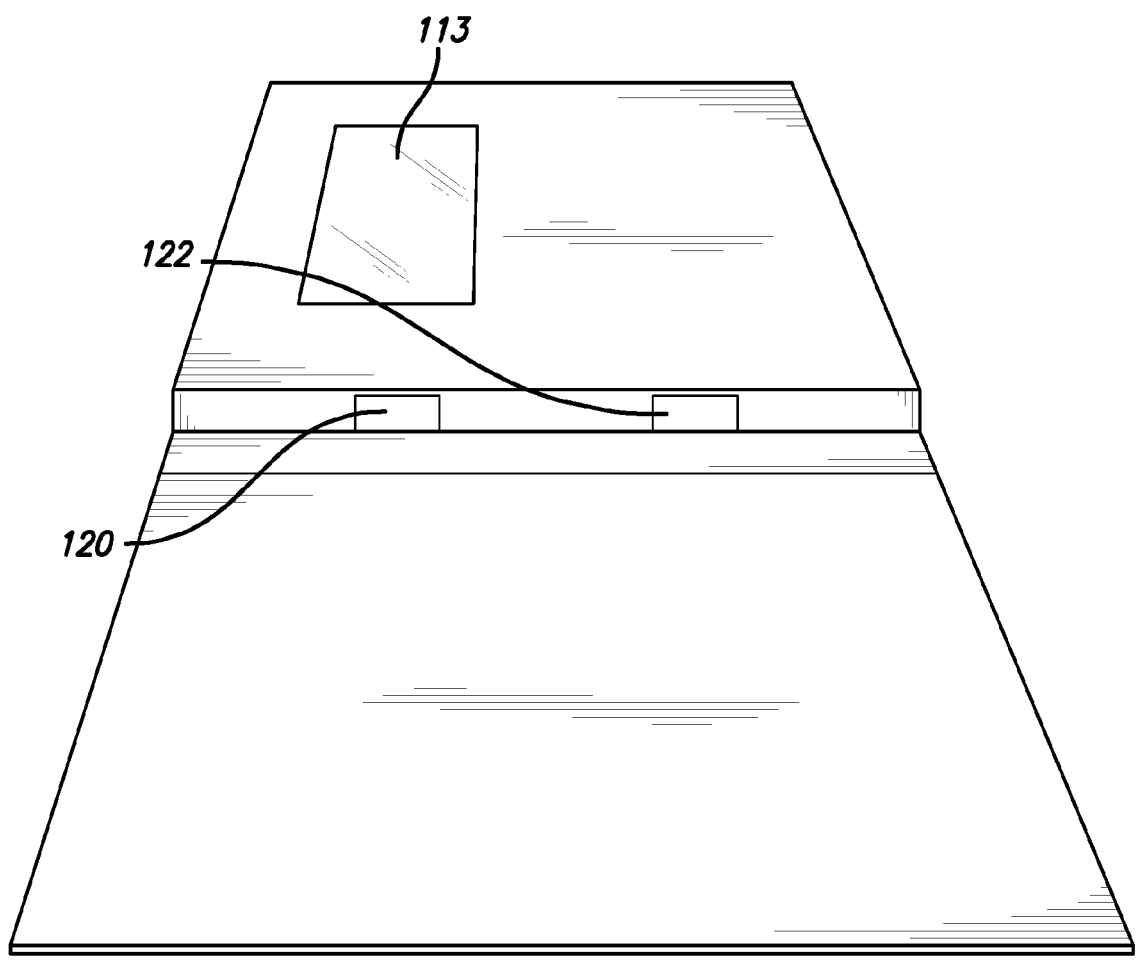
FIG. 4 is a perspective view of another alternate preferred embodiment of the present invention as it is used in a greeting card.

Referring to FIG. 4, a greeting card contains a video screen 113 on which a video has been stored in microchip 10. When switch activator 24 is triggered by the user, it closes the module and energizes microchips 10 and 20 so that a new video can be recorded to replace the existing video. In a preferred embodiment, a new video is recorded through the use of a suitable connector such as the USB connector 120 shown in FIG. 4, although any suitable connection port may be used. Thereafter when switch 12 is activated, the new video will be played back. In addition, the embodiment may also contain a port 122 for recharging the energy source. Thus, the present invention has the ability to have real video in print and to be able to download new content into print to supplement a pre-recorded video, or download overtop of the pre-recorded with a new video, as well as also be able to re-charge the batteries for repeated playings of the video.

In one embodiment, the greeting card also contains prerecorded music and vocals and/or a video on microchip 10 that are/is played back every time that there are no recorded vocals and/or video. When it is prerecorded music and vocals, the vocals can be the lyrics to the song sung by a professional singer or could be instructions on how to operate the card. When it is a video, the video can explain how to operate the card and rerecord a new video.

In one embodiment, continuous pushing on switch activator 26 will alter the speed of the playback of the recorded vocals and music or video. Alternatively in other embodiments, pushing on switch activator 26 will alter the recorded vocals such that they do not sound the same as when they were originally recorded.

By repeatedly pressing on push button 24, the vocals or video may be recorded over and over until satisfactory recorded vocals or video are created by the user. Thereafter, disabling means 11 such as a tape, string, button or the like, may be attached to switch 24 such that pulling on it will disable or break switch 24 so that the module is unable create any further recordings.

In addition, the greeting card could contain at least one gap through which a small bulb or LED could emit light for creating a visual effect when switch 12 is triggered. Likewise, the card could have an additional mechanism such as a camera 52 affixed thereto for creating images when the switch 12 is triggered and thereafter the images could be shown on video screen 113.

In yet further embodiments, the greeting card could contain a means for selecting prerecorded music by way of example, and not limitation, by having a plurality of music choices stored on the microchip and having a switch which is turned to input the exact music selected by the user.

In the embodiment shown in FIG. 3, a further device 15 is supplied in which there is a small housing containing a scent such that when the recipient of the card pulls on a tab, the scent contained within the sealed capsule, a striker will rupture the capsule releasing the scent. Alternatively instead of scent being housed in the capsule, confetti or other items could be released. Alternatively housing 15 could contain a spring loaded capsule such that when the user presses a release, the contents is released.

Figure 5:
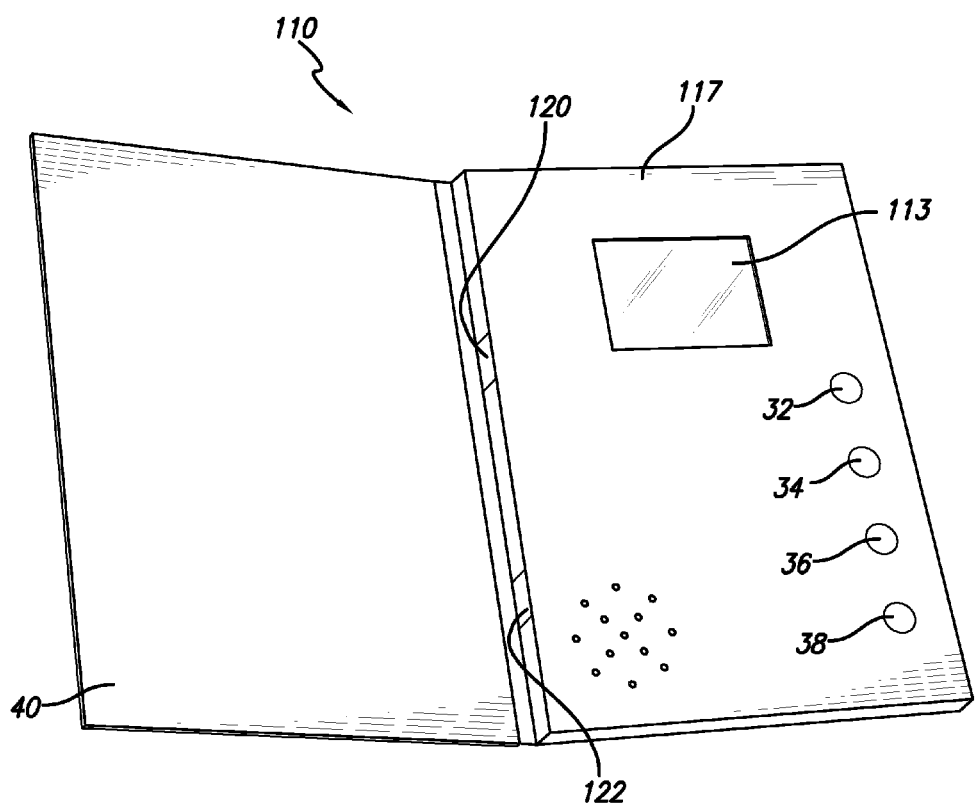
FIG. 5 is a perspective view of another alternate preferred embodiment of the present invention.
Figure 6:
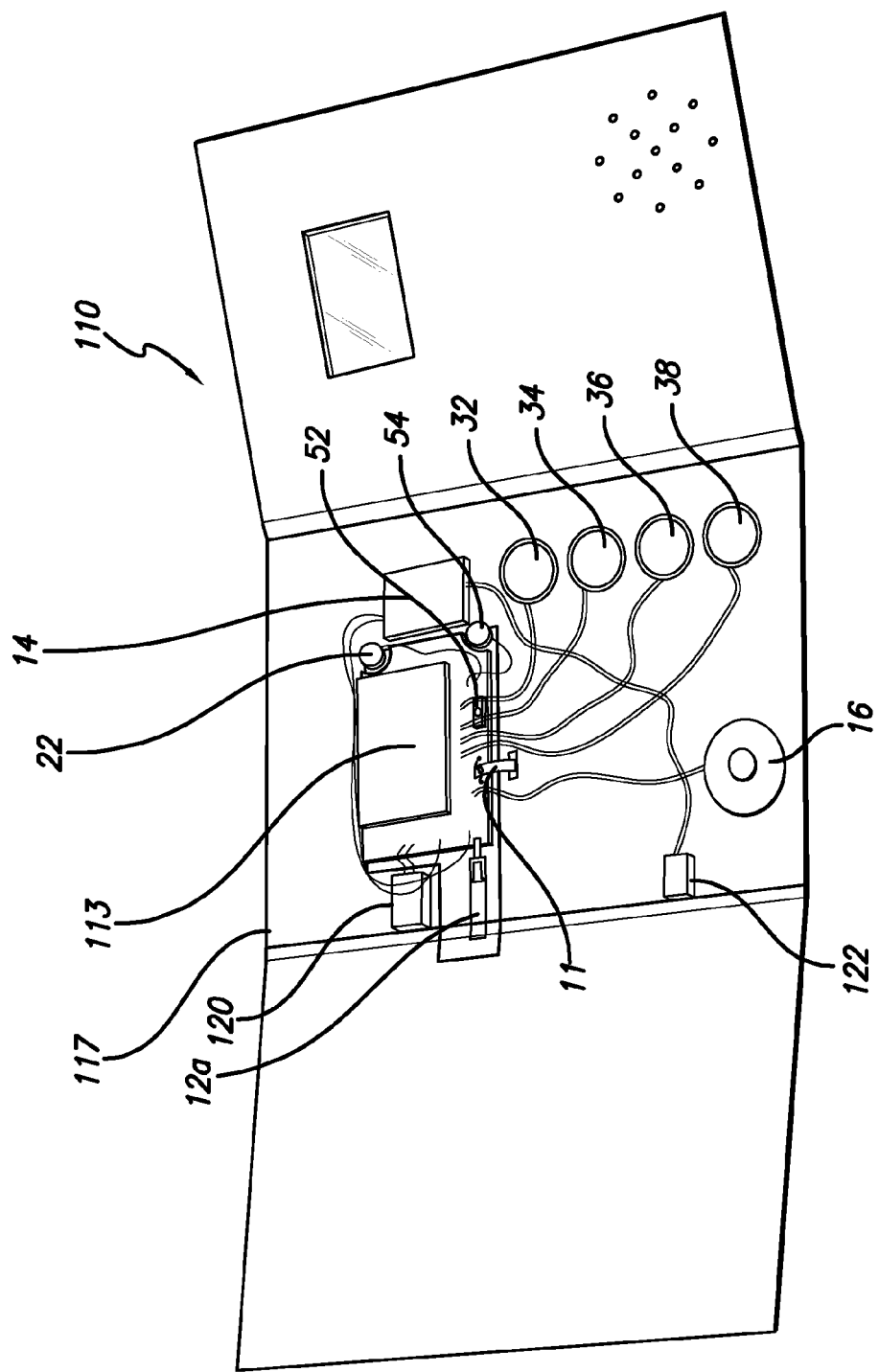
FIG. 6 is a perspective view showing the inside of the embodiment of FIG. 5.

FIGS. 5-6 show another preferred embodiment of the present invention. In this embodiment, the foldable support structure 117 comprises a card 110 that includes a video screen 113 and a plurality of buttons/switch activators (referred to herein as first button 32, second button 34, third button 36 and fourth button 38). The internal components (e.g., the slide tongue, switches, microchips, speaker, mic, video screen, buttons, etc.) associated with the card 110 are the same or similar to those shown in FIGS. 1-4 above. This exemplary embodiment is directed to an implementation of how those components work together to create a commercial embodiment.

A first predetermined media, such as a video (e.g., a movie trailer, song video or the like) is stored in the memory of microchip 20. When the cover 40 of the card 110 is opened, as a result of movement of slide tongue 12a, microchip 10 is activated and the movie trailer stored in microchip 20 begins to play on video screen 113. To stop the trailer from being played, the cover 40 is closed, and, as a result of movement of slide tongue 12a, microchip 10 is deactivated. Accordingly, the first predetermined media (also referred to herein as video one) is associated with slide tongue 12a/switch 12.

Figure 7:
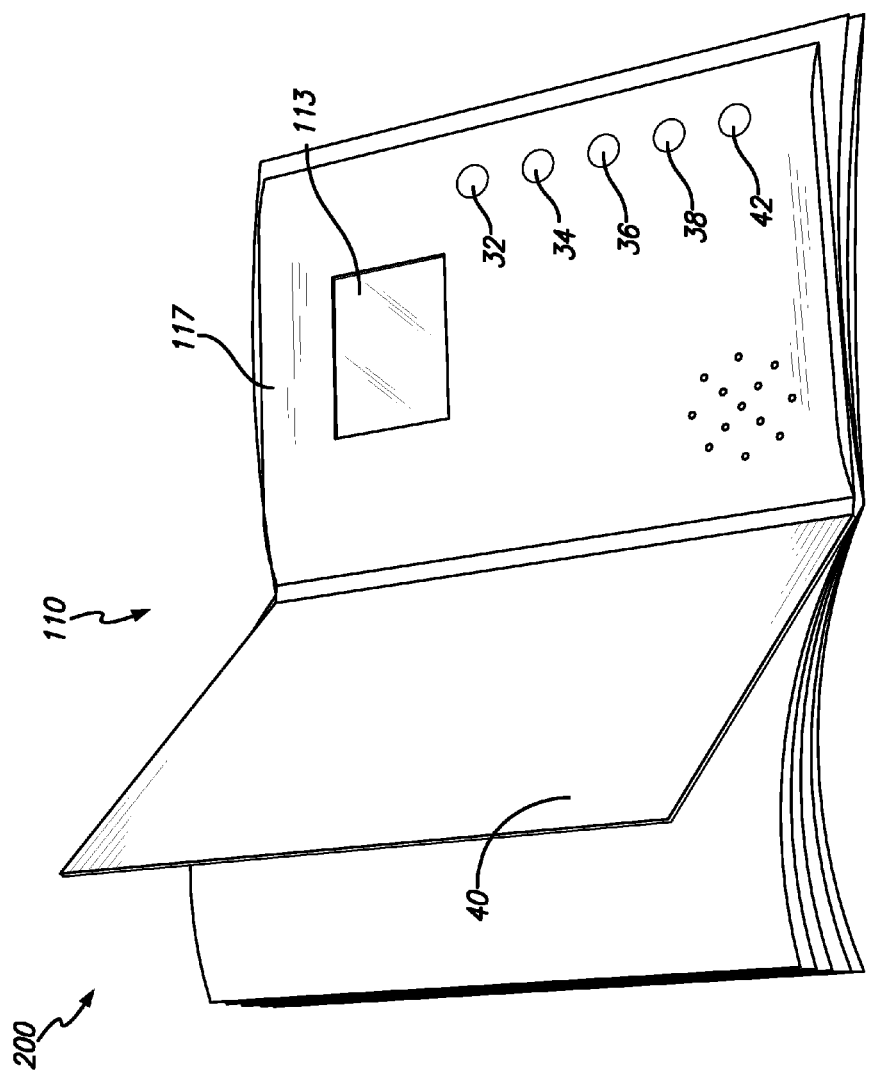
FIG. 7 is a perspective view of another alternate preferred embodiment of the present invention.

It will be appreciated by those skilled in the art that buttons 32, 34, 36 and 38 each have a different predetermined media associated with them (also referred to herein as videos two through five). Each of the buttons 32, 34, 36 and 38 actuates a switch that causes another predetermined media stored in microchip 20 to be played. Accordingly, the second predetermined media is associated with first button 32, the third predetermined media is associated with second button 34, the fourth predetermined media is associated with third button 36, and the fifth predetermined media is associated with fourth button 32. It will be understood that the number of buttons and/or media pieces or clips is not a limitation on the present invention. For example, as shown in FIG. 7, a fifth button 42 having a sixth predetermined media associated therewith can be included.

In use, as described above, when cover 40 is opened, video one begins playing on screen 113. If one of the buttons 32, 34, 36 or 38 is pressed, video one will stop playing and the video associated with the depressed button will begin to play.

Generally, any type of video screen that is thin and can be incorporated into printed material (e.g., greeting card, newspaper, magazine, flyer, brouchure, book, folder, etc.) is within the scope of the present invention. For example, see FIG. 7, where the video screen 113 is incorporated in a magazine 200.

As described above, the video screen 113 can include LCD (liquid crystal display) technology. However, this is not a limitation on the present invention. The video screen 113 can be any type of video screen technology known in the art, such as monochrome, electro-chromic, TFT (thin film transistor), OWED (organic light emitting diode), CSTN (color super-twist nematic), DSTN (double layer STN, dual scan STN), FRSTN (fast response STN), FSTN (film compensated STN, formulated STN or filtered STN), FFSTN (double film super-twist nematic), MSTN (monochrome super-twist nematic), active-matrix electrophoretic display (e-ink) or any other video screen technology now known or later developed.

In another embodiment similar to the one shown in FIG. 5, instead of including a plurality of buttons a single button that cycles through the plurality of videos can be used. In other words, video one is associated with the slide tongue 12a and videos two-five (or any number) are associated with a single button that when pressed the first time starts video two, when pressed a second time starts video three and so on.

These embodiments could be useful, for example, for a movie studio that is releasing a number of different films for the upcoming summer season. They could mail out these cards with the various trailers stored in the memory of the card to consumers, movie houses, businesses, etc. Also the different clips operated by either the slide tongue or the buttons could be different chapters in a movie or TV show (similar to what is used in DVD's). In another embodiment, a single button can be pressed more than once to cycle through the different media or video clips. For example, pressing the button once causes trailer one to play, pressing it again causes trailer two to play, pressing it again causes trailer three to play, etc.

In another embodiment, to make the cards more attractive to consumers, the memory can contain prerecorded media, such as the movie trailers described above, but can also include the capability of recording new videos or downloading new videos as well. For example, a user could have his/her own card for recording and playing back videos (operated by, e.g., button 32), while at the same time, every time he/she opens the card, the movie trailer associated with the slide tongue 12a is played. In other words, in an example, the microchip includes a gigabyte of memory and includes a prerecorded video that takes up 100 megabytes of memory. This prerecorded video is "locked in" and cannot be erased. However, the chip still includes 900 megabytes of free memory that the user can use to record whatever they desire. For example, the use could go to youtube.com and download videos and play those back at a later time. In this embodiment, the card may include a button or buttons that are specifically devoted to the recording and playback of bonus materials.

The media clips can be recorded into memory by the user by pressing a button and recording audio and/or video (as described above), inserting a flash/thumb drive, etc. to USB port 122 to either download to memory or to play directly from the memory of the drive.

It will be understood that the basic configuration of the present invention can include the electronic module including a printed circuit board, speaker, batteries and a video screen. Playing of a video can be actuated in a number of different ways, including a slide tongue, push button, motion sensor, light sensor, magnets, etc. And this can be done to play one or a series of videos. Another embodiments can include a slide tongue actuating the first video and push buttons for actuating other videos. In another embodiment, the slide tongue can be omitted and a plurality of push buttons or other actuation methods (described above) can actuate the videos. In another embodiment, the slide tongue can be omitted and a single push button or other actuation method can be used to cycle through a plurality of videos. In yet another embodiment, the user can download additional information from a computer or other memory storage device to overwrite any pre-recorded messages. In yet another embodiment, the user can download additional information from a computer or other memory storage device in addition to unerasable, pre-recorded messages that still play back even after the additional information has been added by the user.

In another embodiment, instead of activation of a video or audio clip, the closing of the switches can cause something related to smell, touch or taste to occur.

Those skilled in the art will understand that this type of novelty device can be used in a variety of objects such as print media such as greeting cards, magazines, packaging, direct mail, point of purchase ("POP") displays, gift cards; into apparel such as t-shirts, caps, and hats; other devices such as plastic novelty items, sculpted novelty items, figurines, statues, models, watches, jewelry, or any other type of object in which a personalized message would be desired.

The embodiments and methods described above are exemplary embodiments and methods of the present invention. While particular embodiments of the present invention have been illustrated and described, it will be apparent that various modifications can be made without departing from the spirit and scope of the invention. Those skilled in the art may now make numerous uses of, and departures from, the above-described embodiments and methods without departing from the inventive concepts disclosed herein. Thus, the construction of the embodiments and the steps of the methods disclosed herein are not limitations of the invention. Accordingly, the present invention is to be defined solely by the scope of the following claims.

What is claimed is:

1. An apparatus comprising:
   at least a first page and a second page that are movable between a closed position and an open position;
   wherein the second page comprises an electronic module having a circuit, the electronic module comprising:
   at least one chip for storing data and for controlling the electronic module;
   a video screen in data communication with the at least one chip;
   a wireless communication device for receiving first media content;
   a slide tongue extending from the first page to the second page, wherein movement of the first page from the closed position to the open position moves the slide tongue and closes the electronic module circuit such that the first media content is played on the video screen; and
   at least first and second push button switches in electrical communication with the chip mounted on the second page, wherein closing of the first push button switch causes second media content to be played on the video screen and closing of the second push button switch causes third media content to be played on the video screen, wherein the second and third media content is stored on the chip contemporaneously.

2. The apparatus of claim 1 wherein the electronic module and chip are housed in a foldable support structure.

3. The apparatus of claim 1 further comprising a third push button switch in electrical communication with the chip mounted on the second page, wherein closing of the third push button switch causes fourth media content to be played on the video screen, wherein the second, third and fourth media content is stored on the chip contemporaneously.

4. The apparatus of claim 1, farther comprising a rechargeable power source for powering the electronic module.

5. The apparatus of claim 4 further comprising a port connected to the rechargeable power source for recharging the rechargeable power source.

6. The apparatus of claim 3 further comprising fourth and fifth push button switches in electrical communication with the chip mounted on the second page, wherein closing of the fourth push button switch causes fifth media content to be played on the video screen and closing of the fifth push button switch causes sixth media content to be played on the video screen.

7. A method of playing media content, the method comprising the steps of:
providing a foldable support structure having a video screen, a wireless communication device an energy source, a memory having at least second and third media content stored therein, and at least one port, wherein the foldable support structure has a closed position and an open position and the foldable support structure is initially in the closed position,
moving the foldable support structure to the open position, thereby closing a first switch,
receiving first media content via the wireless communication device and playing the first media content on the video screen,
pushing a first button, thereby closing a second switch and playing the second media content on the video screen, pushing a second button, switch and playing the third media content on the video screen, and
plugging a source of energy into the port and recharging the energy source housed in the foldable support structure.

8. The method of claim 7 further comprising the step of plugging a data source into the port and uploading media to the memory housed in the foldable support structure.

9. The method of claim 8 wherein the first media content is received from the internet.

10. A magazine comprising at least four pages, wherein a first page comprises:
a. an electronic module that includes at least one chip for storing data and for controlling the electronic module,
b. a video screen in data communication with the at least one chip,
c. a wireless communication device in data communication with the at least one chip, and
d. a first switch, wherein when the first switch is closed first media content received from the wireless communication device is shown on the video screen, and
e. second and third switches, wherein the chip has at least second and third media content stored therein, wherein when the second switch is closed the second media content is shown on the video screen, and wherein when the third switch is closed the third media content is shown on the video screen.

11. The magazine insert of claim 10 wherein the chip is housed in a foldable support structure that includes print thereon.

12. The magazine insert of claim 11 wherein the other pages do not include any electronic components.

13. The magazine insert of claim 11 wherein the first page further comprises a rechargeable power source for powering the electronic module.

14. The magazine insert of claim 13 further comprising a port connected to the rechargeable power source for recharging the rechargeable power source.

15. The magazine insert of claim 11 further comprising a port for downloading videos to the chip.

16. A method for displaying media content on a video screen on a page of a magazine or book, the method comprising the steps of:
providing a magazine or book with at least four pages, wherein one of the pages comprises an electronic module that includes at least one chip for storing data, a wireless communication device in data communication with the at least one chip, and a video screen in data communication with the at least one chip, wherein the magazine includes a slide tongue extending from a first page to a second page;
turning a page of the magazine or book to reveal the video screen thereby causing a first switch to be closed and first media content received by the wireless communication device to be played on the video screen; wherein the chip has at least second and third media content stored thereon,
pressing a first button, thereby causing the second media content to be played on the video screen, and
pressing a second button, thereby causing the third media content to be played on the video screen.

* * * * *